(12) United States Patent
Gahler (10) Patent No.: US 12,058,963 B1
(45) Date of Patent: Aug. 13, 2024

(54) DEVICES AND METHODS FOR REDUCING GRAIN BIN ENTRAPMENT AND GRAIN BIN SPOILAGE

(71) Applicant: Mason Gahler, Pierz, MN (US)

(72) Inventor: Mason Gahler, Pierz, MN (US)

(73) Assignee: Gahler Innovations LLC, Pierz, MN (US)

( * ) Notice: Subject to any disclaimer, the term of this patent is extended or adjusted under 35 U.S.C. 154(b) by 0 days.

(21) Appl. No.: 18/506,712

(22) Filed: Nov. 10, 2023

Related U.S. Application Data (60) Provisional application No. 63/497,571, filed on Apr. 21, 2023.

(51) Int. Cl.
| | | |
|---|---|---|
| *A01F 25/18* | (2006.01) | |
| *B65G 3/04* | (2006.01) | |
| *A01F 25/16* | (2006.01) | |
| *B65G 33/08* | (2006.01) | |

(52) U.S. Cl.
CPC .............. *A01F 25/186* (2013.01); *B65G 3/04* (2013.01); *A01F 25/163* (2013.01); *B65G 33/08* (2013.01); *B65G 2814/0264* (2013.01)

(58) Field of Classification Search
None
See application file for complete search history.

(56) References Cited

U.S. PATENT DOCUMENTS

| | | | | |
|---|---|---|---|---|
| 2,517,456 A | * | 8/1950 | Wherrett | B01F 27/9211 366/102 |
| 3,185,449 A | * | 5/1965 | Kasten | A01K 5/0266 366/156.1 |
| 3,563,399 A | * | 2/1971 | Shivers | F26B 9/085 366/147 |
| 3,643,819 A | * | 2/1972 | Halcomb | A01F 25/186 414/293 |
| 3,780,993 A | * | 12/1973 | Kline | B01F 33/5023 366/603 |
| 4,026,528 A | * | 5/1977 | Kline | A01K 5/004 241/101.8 |
| 4,151,932 A | * | 5/1979 | Wachtler | G01G 13/026 222/77 |
| 4,217,917 A | * | 8/1980 | Kilpelainen | B03B 5/52 366/186 |
| 4,669,941 A | | 6/1987 | West et al. | |
| 4,824,312 A | | 4/1989 | Schiltz | |
| 5,098,247 A | * | 3/1992 | Campbell | B65G 65/365 414/326 |

(Continued)

FOREIGN PATENT DOCUMENTS

| | | |
|---|---|---|
| JP | 4764333 B2 | 8/2011 |
| KR | 790001489 B1 | 10/1979 |
| WO | 2004067414 A1 | 8/2004 |

*Primary Examiner* — Joseph A Dillon, Jr.

(74) *Attorney, Agent, or Firm* — Aurora Consulting LLC; Ty F. Davis; Ashley Sloat (57) ABSTRACT

Systems and methods described herein are intended for the reduction of grain bin entrapment. A method may include coupling at least a portion of a casing housing an auger to at least a portion of an inner sidewall of a grain bin. A method may include activating a power source of the auger to cause the auger to gather grain from a bottom portion of the grain bin and convey the grain to a top portion of the grain bin, thereby reducing an amount of the grain that is attached to the inner sidewall of the grain bin.

19 Claims, 9 Drawing Sheets

(56) References Cited

U.S. PATENT DOCUMENTS

| | | | |
|---|---|---|---|
| 5,167,318 A | 12/1992 | Siemens | |
| 5,338,115 A * | 8/1994 | Gregg | B01F 27/9214 |
| | | | 415/88 |
| 5,727,742 A * | 3/1998 | Lawson | A47J 43/0722 |
| | | | 241/199.12 |
| 6,203,261 B1 * | 3/2001 | South | B65G 69/08 |
| | | | 198/511 |
| 6,499,930 B1 | 12/2002 | Dixon | |
| 6,575,615 B2 * | 6/2003 | Rowe | A01K 5/004 |
| | | | 366/186 |
| 7,818,894 B2 | 10/2010 | Noyes et al. | |
| 7,967,502 B2 * | 6/2011 | Tamminga | B01F 35/452 |
| | | | 366/603 |
| 9,963,293 B2 | 5/2018 | Pleima et al. | |
| 2003/0227817 A1 * | 12/2003 | Martel | B01F 33/81 |
| | | | 366/157.4 |
| 2004/0022121 A1 * | 2/2004 | Yamamoto | B01F 35/4111 |
| | | | 366/261 |
| 2005/0169103 A1 * | 8/2005 | Joranlien | A01K 5/004 |
| | | | 366/314 |
| 2007/0274151 A1 * | 11/2007 | Albright | B01F 35/452 |
| | | | 366/314 |
| 2011/0110184 A1 * | 5/2011 | Liet | B01F 27/9212 |
| | | | 366/314 |
| 2013/0140246 A1 * | 6/2013 | Fabiyi | C02F 1/74 |
| | | | 261/36.1 |
| 2018/0304212 A1 * | 10/2018 | Letts | B01F 33/86 |

* cited by examiner

Prior Art

Prior Art

FIG. 8

Prior Art

FIG. 9

DEVICES AND METHODS FOR REDUCING GRAIN BIN ENTRAPMENT AND GRAIN BIN SPOILAGE

CROSS-REFERENCE TO RELATED APPLICATIONS

This application claims the priority benefit of U.S. Provisional Patent Application Ser. No. 63/497,571, filed Apr. 21, 2023, the contents of which is herein incorporated by reference in its entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of agriculture, and more specifically to the fields of safety equipment in agriculture and grain drying. Described herein are systems and methods for reducing grain bin entrapment.

BACKGROUND

Grain bin entrapment is a serious occupational hazard in the agriculture industry, which can lead to fatalities. The leading cause of death in grain bins is suffocation caused by engulfment in grain. Other contributing factors include lack of proper safety equipment, inadequate training, and failure to follow safety protocols. Engulfment in grain occurs when an individual is buried in grain and cannot breathe due to the pressure on their chest, resulting in suffocation. Conventional methods of addressing grain bin entrapment include safety measures, such as wearing safety harnesses and using lockout/tag-out procedures. Education and training have also been used to reduce the risk of grain bin entrapment and fatalities in the agriculture industry.

However, despite these conventional measures being in place, Purdue University recently published a study in April 2022 showing that the number of non-fatal grain entrapment cases in 2021 was the fifth largest ever recorded. Of the reported entrapment cases in 2021, 38% resulted in a fatality, a rate higher than the five-year average. Said another way, number of people dying in grain bins can range from 20 to 40 deaths per year in the U.S. alone. This number is growing because bins are getting larger with more holding capacity.

Accordingly, there exists a need for new and improved devices and methods for reducing grain bin entrapment.

SUMMARY

In some aspects, the techniques described herein relate to a method for reducing grain attachment to an interior wall of a storage container, including: coupling at least a portion of a casing housing an auger to at least a portion of an inner sidewall of a grain bin; and activating a power source of the auger to cause the auger to gather grain from a bottom portion of the grain bin and convey the grain to a top portion of the grain bin, thereby reducing an amount of the grain that is attached to the inner sidewall of the grain bin.

In some aspects, the techniques described herein relate to a method for reducing grain attachment to an interior wall of a storage container, including: fixedly attaching a plurality of portions of a casing housing of an auger to a plurality of sidewall portions of a vertical inner sidewall of a grain bin having a flat bottom; and auger is fully encased in the housing; activating a power source of the auger to cause the auger to gather grain from a bottom portion of the grain bin and convey the grain to a top portion of the grain bin, thereby rotating a volume of the grain bin, thereby rotating the grain that is attached to the inner sidewall of the grain bin, and wherein the auger is activated during a time period during grain storage.

In some aspects, the techniques described herein relate to a system for reducing grain attachment to an interior wall of a storage container, including: one or more casings each housing an auger; one or more coupling elements configured to couple the one or more casings to at least a portion of a vertical inner sidewall of a grain bin; a power source configured to activate the auger; and control circuitry configured to control the power source.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the claimed subject matter. Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

Disclosed herein are systems, devices, and methods for increasing grain flow in a grain bin, rotating a substantial portion of the volume of grain stored in a grain bin, reducing an amount of grain stuck or attached to a sidewall of a grain bin, reducing moisture-related spoilage, and/or reducing grain bin entrapment. Described herein are systems and devices that function to rotate (i.e., circulate) the grain, so it doesn't mold, clump, and/or spoil. When grain is put in a bin, it can become spoiled, which can cause the grain to stop flowing while being unloaded. It is dangerous when the farmer goes into the bin to get the grain to flow again. If the flow restarts or continues while the farmer is still in the bin, the grain could collapse and engulf the farmer causing serious injury or death.

Although the various embodiments described herein are described with respect to a grain bin, one of skill in the art will appreciate that any material may be conveyed using the systems, devices, and methods described herein. For example, materials may include grain, fertilizer, compost, feed, manure, soil, salt, sand, etc.

When storing contents (e.g., grain) in bins, moisture is a major concern for reducing spoilage, allowing efficient transfer of contents from within the bin, and reducing grain bin entrapment, during long-term storage of contents. For example, grain may be loaded into storage bins with a considerably greater moisture content than the grain when it is unloaded after long-term storage. As such, moisture migrates from the grain and exits the bin to the environment surrounding the bin. In this process, moisture may condense (when conditions allow) to the inner sidewall of the grain bin. Condensation, including on the inner sidewall of the grain bin, is a major cause of grain spoilage near the inner sidewall, the clumping of grain near the sidewall of the grain bin, the sticking of grain to the inner sidewall of the grain bin, and, thus, grain bin entrapment. To reduce these effects, circulation of the grain (or other contents) may be used to reduce build-up of moisture in the grain near the sidewall of the grain bin. Additionally, circulation of bin contents reduces the ingress moisture effects if the bin includes areas with insufficient ingress protection (e.g., leaks, damaged portions, weather-damaged gaskets, or the like). For any of the embodiments described herein, material (e.g., grain, fertilizer, manure, soil, etc.) from a bottom portion or region of the bin gets circulated to a top portion or region of the bin, which helps dry the material, reduce clumping (especially to sidewalls of the bin), and reduces the need for individuals to enter the bin.

Figure 6:
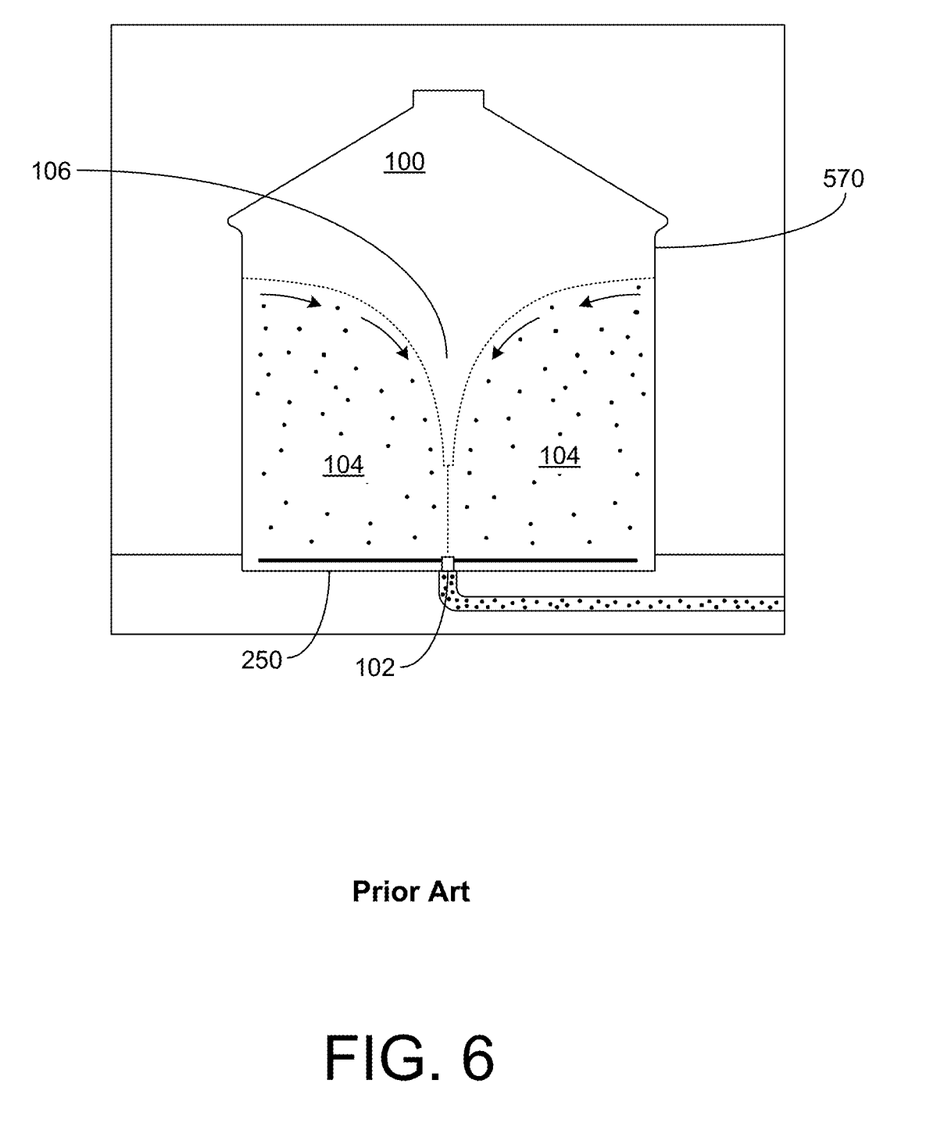
FIG. 6 is a prior art illustration of a bin and the possible effects on stored grain when unloading with a traditional system.
Figure 8:
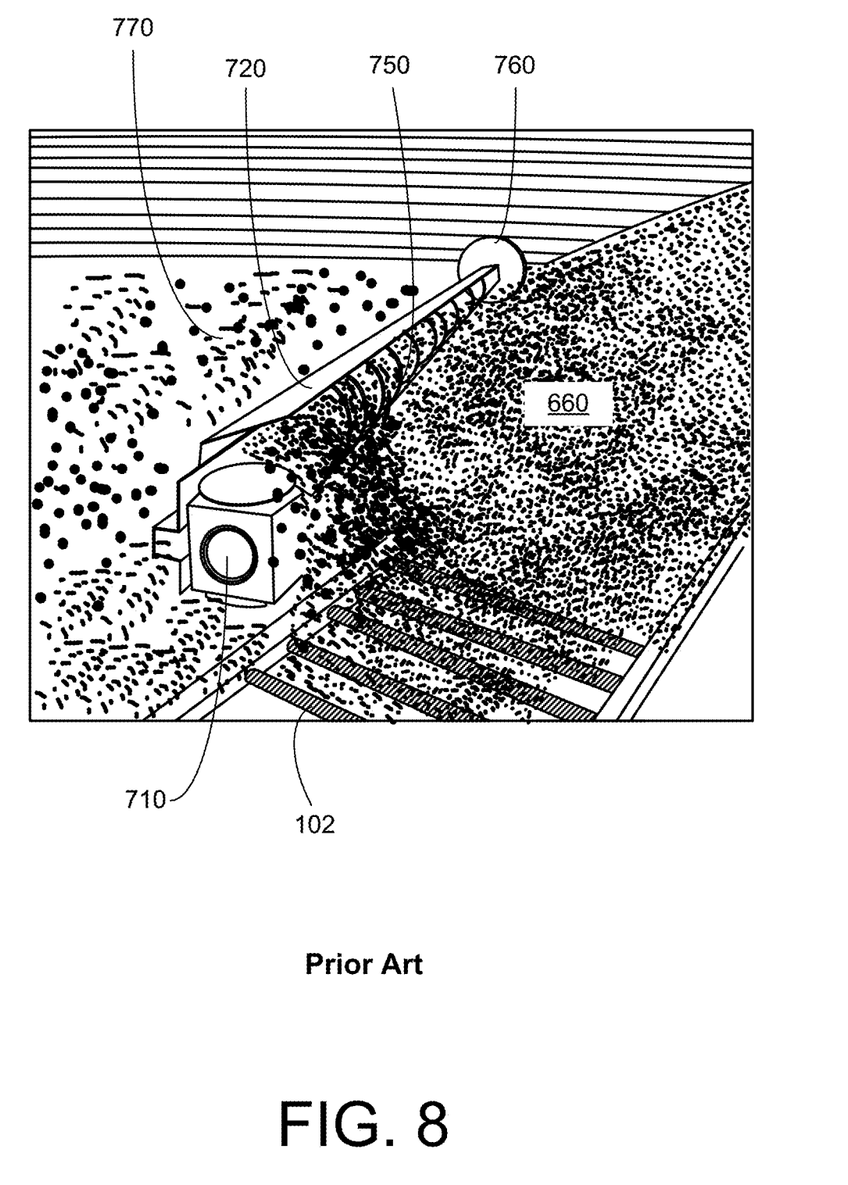
FIG. 8 is a prior art illustration of a sweep auger assembly known in the art within a bin.
Figure 9:
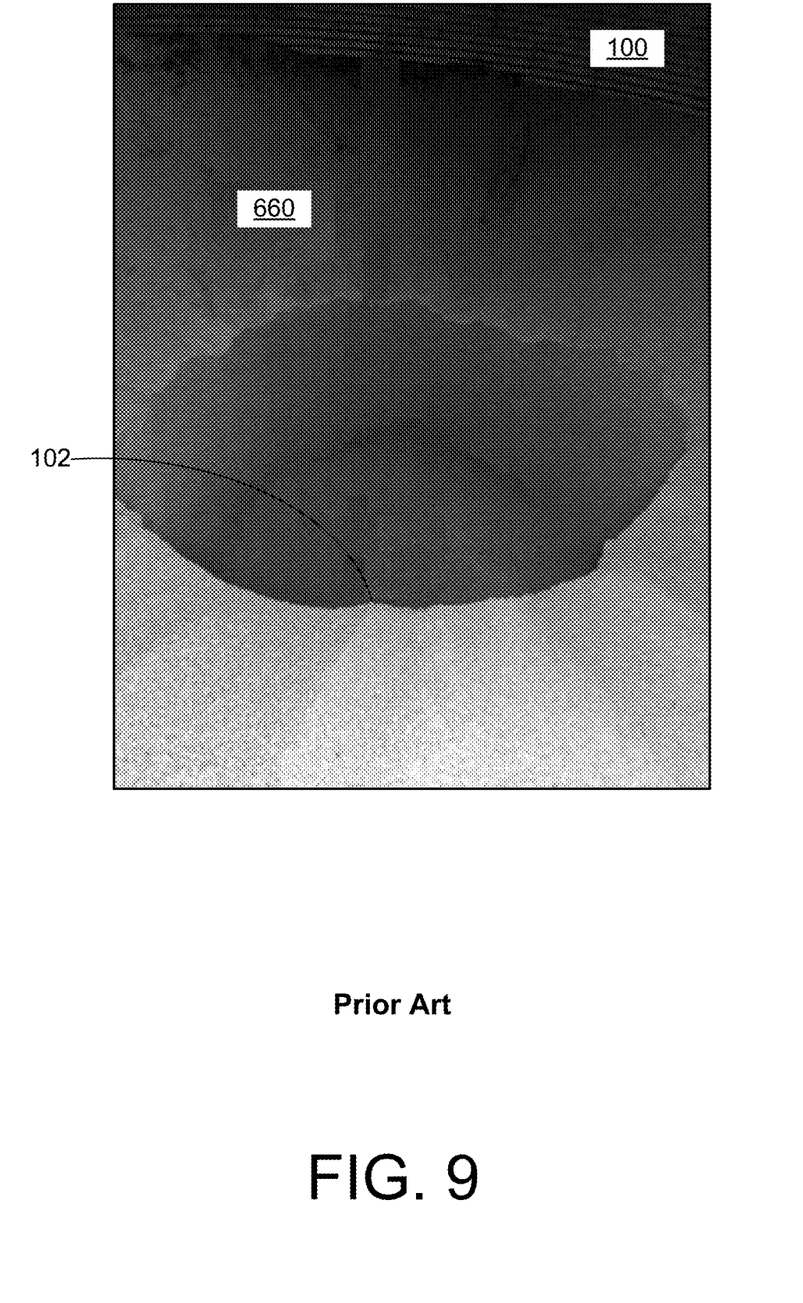
FIG. 9 is a prior art illustration of the possible effects on grain stored in a grain bin and unloaded with a traditional system.

Material (e.g., grain, fertilizer, manure, soil, etc.) stored in a bin may experience extended periods of inactivity (i.e., no loading or unloading of material). As such, the extended inactivity periods introduce conditions that may cause spoilage, clumping, and sticking of material as the material remains static. As shown in FIG. 6, conventional systems used on flat bottom bins unload from a sump 102 in the center of the bin 100, and, as such, gravity forces material to the sump 102 of the bin 100 in a conical fashion (illustrated by the cone area 106). Material in area 104 between the sidewall 270 of the bin 100 and the material in the cone area 106 being fed to the sump 102 may remain static even during unloading of the bin. Conventional systems may be paired with a sweep auger assembly 770 (shown in FIG. 8) to help transfer material in area 104 between the sidewall of the bin and the material of the cone area 106 being fed to the sump 102, but the sweep auger assembly 770 is typically only used after gravity has driven all the material in the cone area 106 into the sump 102. Additionally, sweep augers are typically only used during active unloading periods. As shown in FIG. 8, the sweep auger assembly 770 includes a sweep auger 750, a partial housing 720, a power source 710 (e.g., a gearbox), and a wheel 760. The sweep auger 750, when driven by the power source 710, transfers grain to the sump 102. The wheel 760 being coupled to the auger 750 is rotated and drives the assembly 770 toward the remaining grain 660. When contacted by the auger 750, partially surrounded by the housing 720, the grain 660 is transferred toward the sump 102. Contact of the auger 750 and the grain 660 is ensured by the wheel 760 rotating toward the grain 660. After the gravity driven material in the cone area 106 has been unloaded, the effects (e.g., the clumping of grain near the sidewall of the grain bin, the sticking of grain to the inner sidewall of the grain bin, and, thus, grain bin entrapment when a person goes into the bin to remove the grain from the sidewalls) of the material remaining static may have already occurred. Conventional systems that include volume circulation systems may only provide circulation when the bin 100 is actively being unloaded and may only gather material (e.g., grain 660) from the position of the sump 102 (i.e., the center of the bin). As such, conventional systems do not address the static material state during periods of inactivity or provide circulation for material in the area 104 between the sidewall 270 of the bin 100 and the gravity-driven cone area 106. FIG. 9 shows the inside of a bin equipped with only a traditional unloading system. FIG. 9 shows uncirculated (i.e., static) grain 660 that has stuck together forming a cohesive form in which the grain 660 will no longer migrate toward the sump 102. The cohesive grain 660 structure occurs in the uncirculated area 104 (shown in FIG. 6). Cohesive grain 660, as shown in FIG. 9, includes a high probability of entrapment.

Figure 1:
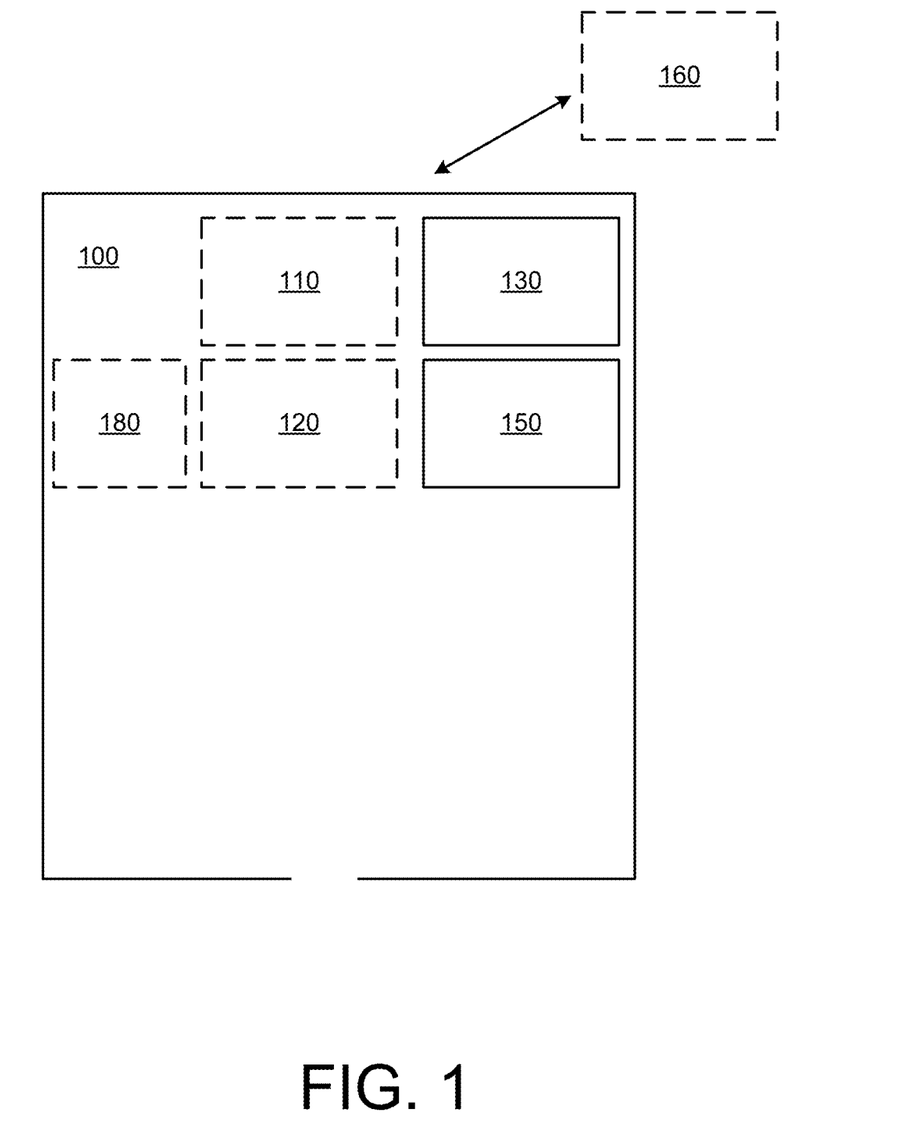
FIG. 1 illustrates an embodiment of a system for reducing bin entrapment.
Figure 2:
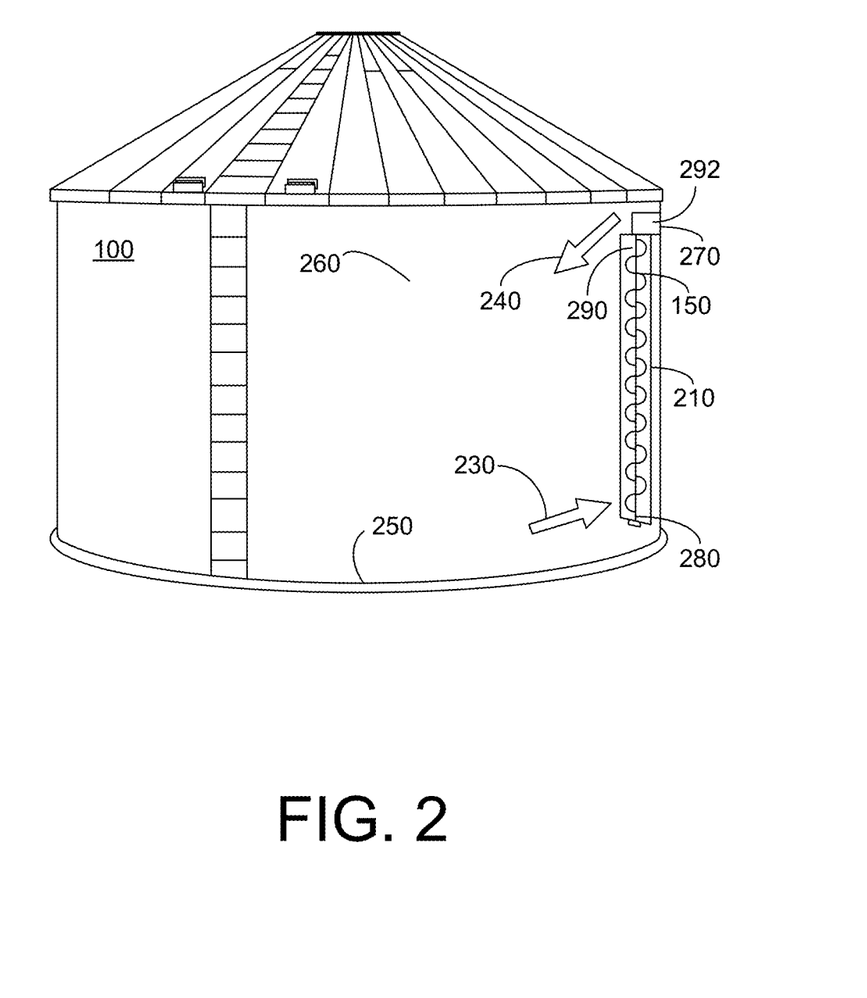
FIG. 2 illustrates a transparent view of a bin including an embodiment of a device for reducing bin entrapment installed therein.

The systems and methods described herein solve the above problems. For example, as shown in FIGS. 1-2, various embodiments of systems and devices of reducing grain bin entrapment include a power source 130 and an auger 150 attachable to at least a portion of an inner sidewall 270 of a grain bin 100. For example, a casing 210 housing the auger 150 may be attached to at least a portion of an inner sidewall 270 of the grain bin 100. As shown in FIG. 1, a system may further optionally include optional control circuitry 110, an optional antenna 120, one or more optional sensors 180, and an optional computing device 160 communicatively coupled (e.g., Wi-Fi®, LTE, Bluetooth, cellular, etc.) to the optional control circuitry 110 via optional antenna 120.

As shown in FIGS. 1-2, an auger 150 is a type of screw conveyor used to move materials such as grain, feed, or fertilizer horizontally, vertically, or at any angle therebetween. An auger includes a rotating helical screw blade, also known as a flighting, that is contained within a tube or casing 210. When the auger 150 is activated using power source 130, the helical blade rotates and moves the material along the length of the tube or casing 210. For example, the helical blade may move or convey grain, feed, or fertilizer from a bottom portion 250 of a grain bin 100 to a top portion 260 of the grain bin 100 causing circulation of bin 100 contents. The pitch of the helical blade, or the distance between the threads, determines the amount of material that is moved with each revolution of the blade. In a vertical auger 150, as shown in FIG. 2, the material is lifted or conveyed from a bottom end 280 of the auger 150 using power from the power source 130, for example a motorized pulley, an electric motor, a hydraulic system, an engine (e.g., variable speed engine), or other power system, and then distributed, released, or otherwise exits a top end 290 or discharge end of the auger 150. The power source 130 may be hardwired into an electrical box for the bin 100, may include one or more batteries for storing solar energy from one or more solar panels coupled to the bin 100, or the like. Further for example, arrow 230 shows the movement of material into a bottom end 280 of the auger 150 and arrow 240 shows the exiting of material at a top end 290 of the auger 150. Not limiting examples of augers that may be used include Westfield augers or Rigid augers.

A casing 210 housing the auger 150 is coupled to at least a portion of a sidewall 270 of the bin 100 by one or more coupling elements 292. One or more coupling elements 292 may include bolts, screws, straps, and the like. For example, one or more metal straps may be used along the length of the casing 210 to secure the casing 210 to the sidewall 270 of the bin 100. In some embodiments, the coupling between the casing 210 and at least a portion of the sidewall 270 of the bin 100 is positioned so that the power source 130 and/or transmission elements (e.g., belts, chains, or the like) are above the material in the bin 100.

One of skill in the art will appreciate that augers can vary in size and configuration depending on the application. As such, one of skill in the art will appreciate that any size of auger can be used herein, for example depending on the material being conveyed, a volume of the bin in which the material is stored, a desired flow of material in the bin, and the like. In some embodiments, a number of augers to be installed is determined based on a volume of the grain bin or a number of bushels a grain bin can store. For example, grain bins may store from about 800 bushels to about 2,500 bushels, from about 2,500 bushels to about 5,000 bushels, from about 5,000 to about 7,500 bushels, from about 7,500 bushels to about 11,000 bushels, from about 11,000 bushels to about 15,500 bushels, from about 15,500 bushels to about 20,500 bushels, from about 20,500 bushels to about 25,000 bushels, from about 25,000 bushels to about 30,000 bushels, from about 30,000 bushels to about 42,000 bushels, from about 42,000 bushels to about 55,000 bushels, or from about 55,000 bushels to about 71,000 bushels. Accordingly, a length and/or a number of augers may be adjusted based on a number of bushels the grain bin is capable of storing or a volume of the grain bin in which the auger(s) are to be installed. For example, a number of augers installed in a bin may be an auger, one or more augers, more than one auger, or a plurality of augers. Further for example, a number of augers installed in a bin may be about one auger to about five augers, about five augers to about 10 augers, about 10 augers to about 25 augers, about 25 augers to about 50 augers, about 50 augers to about 100 augers, or greater than 100 augers may be installed on various portions of an inner sidewall of a bin.

Some embodiments, as shown in FIG. 1, of a system for reducing grain bin entrapment may include an optional control circuitry 110 for activating and deactivating the power source 130. The activated power source 130 causes the auger 150 to convey material from a bottom portion 250 of the bin to a top portion 260 of the bin 100 (shown in FIG. 2). The control circuitry 110 may include a processor and/or functional circuitry (e.g., a timing circuit) to control activation of the power source 130.

In some embodiments, as shown in FIG. 1, of a system for reducing grain bin entrapment includes an optional control circuitry 110 (e.g., including a processor) electrically coupled to memory storing instructions and an optional antenna 120. The optional control circuitry 110 (e.g., including a processor) can receive information, data, or inputs, via antenna 120, from the optional computing device 160 and/or transmit or output information or data, via antenna 120, to the optional computing device 160. The optional computing device 160 may be a workstation, a desktop computer, a laptop, a server, a mobile computing device, a wearable device, and the like. For example, in some embodiments, the power source 130 may be electrically coupled to the optional control circuitry 110 (e.g., including a processor). Upon the optional control circuitry 110 (e.g., including a processor) receiving, via optional antenna 120, an input (e.g., audio, text, selection or activation of a user input element on a display of a computing device, etc.) from the optional computing device 160, the optional control circuitry 110 (e.g., including a processor) may execute instructions stored in the memory including: activating the power source 130. The activated power source 130 causes the auger 150 to convey material from a bottom portion 250 of the bin to a top portion 260 of the bin 100 (shown in FIG. 2). The auger 150 may be activated during bin loading, bin unloading, intermittently (e.g., every other day, once a week, once a month, biweekly, etc.), or any point during the storage of materials. One or more optional sensors 180 (e.g., humidity sensors, moisture sensors, or the like) may be used to measure moisture levels within the bin 100 (e.g., at or near the sidewall 270 shown in FIG. 2). If measured moisture levels are greater than a predetermined level, the optional control circuitry 110 (e.g., including a processor) may execute instructions stored in the memory including: activating the power source 130. Alternatively, or additionally, upon the optional control circuitry 110 (e.g., including a processor) receiving, via optional antenna 120, an input from the optional computing device 160, the optional control circuitry 110 (e.g., including a processor) may execute instructions stored in memory including automatically deactivating the power source 130, for example when a bin is substantially empty, during bin loading, during bin unloading, and the like. One or more optional sensors 180 (e.g., ultrasonic distance sensors, or the like) may be used to measure the level of the of grain or contents within the bin 100. The optional control circuitry 110 (e.g., including a processor) may execute instructions stored in memory including automatically deactivating the power source 130 if the level of grain or contents are less than a predetermined amount. The deactivated power source 130 may stop transmitting power to the auger 150, such that the auger 150 stops conveying material from a bottom portion 250 of the bin to a top portion 260 of the bin 100 (shown in FIG. 2).

In some embodiments of a system for reducing grain bin entrapment, as shown in FIG. 1, includes an optional control circuitry 110 (e.g., including a timing circuit) and one or more additional hardware (e.g., relays, solenoid switches, h-bridges, etc.). For example, timing circuits are electronic circuits that generate precise and controlled time intervals or delays. Timing circuits typically include components such as resistors, capacitors, oscillators and/or timers to provide accurate timing for, for example, the timing of cyclical auger actuation events. For example, a timing circuit may be used to activate one or more augers intermittently (e.g., every other day, once a week, once a month, biweekly, etc.) by electronically communicating power from the power source 130 to the auger 150. Some embodiments may include a timing circuit and other control hardware for activation and/or deactivation of the auger 150. For example, local inputs (e.g., buttons, switches, etc.) may be used for control inputs, for example to activate and deactivate the auger 150. Control inputs may be used to initialize an on-cycle for the auger 150. Said another way, a control input (e.g., a button) may be used to start the auger 150 and the timing circuit may maintain the auger 150 in the on-state for a pre-determined amount of time (e.g., . . . ) before deactivating the auger 150 autonomously. Additionally, or alternatively, some embodiments may utilize an antenna 120 as an activation and/or deactivation control input. For example, a remote signal may be sent from a wireless transmitter and received by the antenna 120 as a signal to start or stop the auger 150. Once again, the control input (i.e., remote signal) received by the antenna 120 may be used to start the auger 150 and the timing circuit may maintain the auger 150 in the on-state for a pre-determined amount of time (e.g., . . . ) before deactivating the auger 150 autonomously.

Embodiments described herein may be used in conjunction with systems known in the art for the reduction of bin contents sticking to the sidewall of bins. For example, embodiments may be used with shakers (e.g., vibrational mechanisms to shake contents and sidewalls), fluffers (e.g., forced ventilation devices), or the like.

Figure 3:
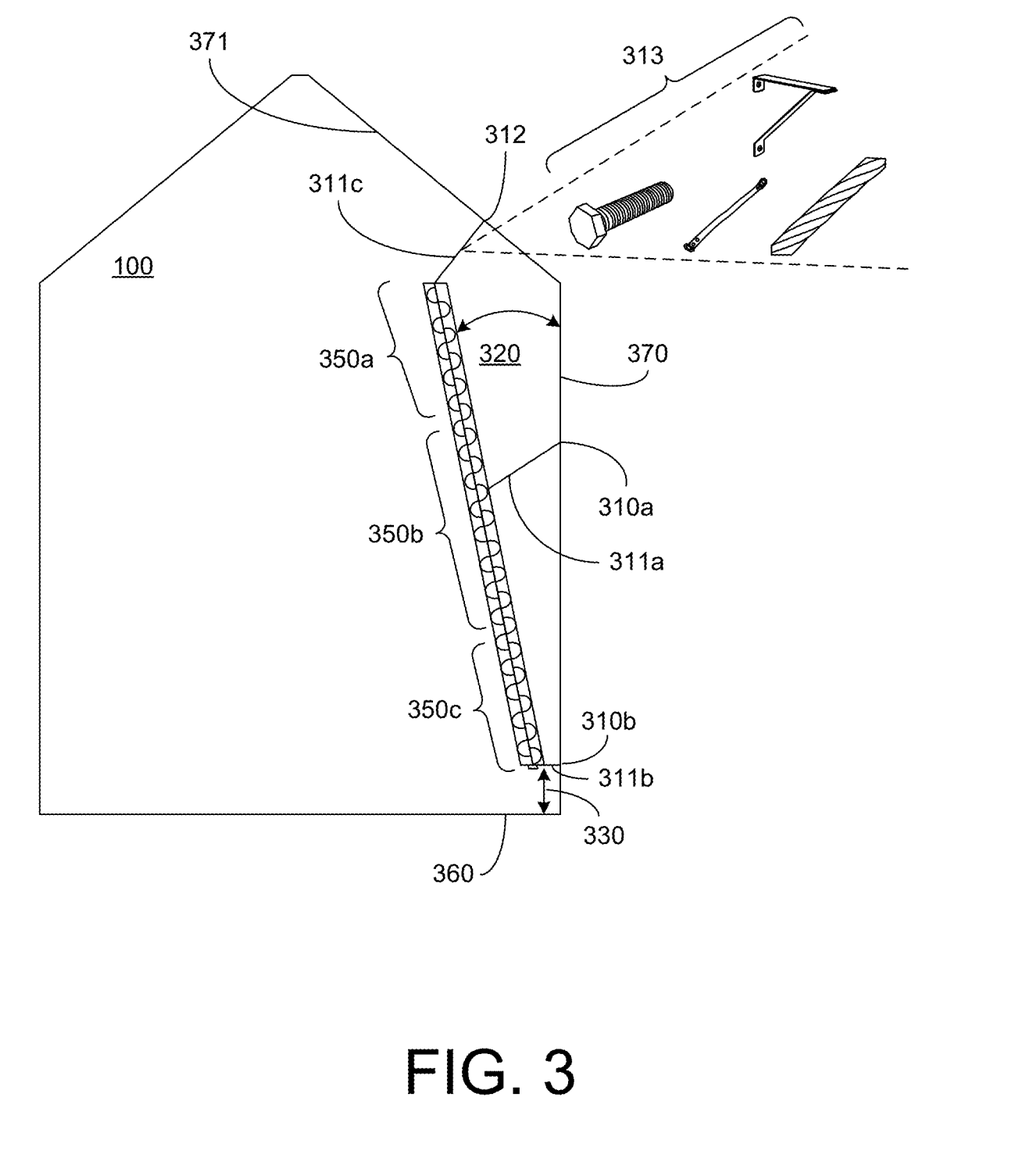
FIG. 3 illustrates an embodiment of a bin including an embodiment of a device for reducing entrapment installed therein.

FIG. 3 shows an embodiment of a device for reducing entrapment, installed in the bin. One or more augers or auger portions 350a, 350b, 350c are installed in bin 100. For example, there may be one, 1 to 2, 1 to 5, 5 to 10, 2 to 3, etc. installed augers or auger portions. In embodiments having two or more augers or auger portions, the augers or auger portions may be modular and/or matingly connected, for example via one or more splines, latches, screw connections, or the like. As shown in FIG. 3, the one or more augers or auger portions 350a, 350b, 350c are coupled to at least a portion of an inner sidewall 370 of the bin 100. For example, the one or more augers or auger portions 350a, 350b, 350c may be coupled to the bin 100 on at least a first portion 310a (e.g., a top portion) of sidewall 370. In some variations, the one or more augers or auger portions 350a, 350b, 350c may be coupled to the bin 100 on at least a first portion 310a (e.g., a top portion) of sidewall 370 via coupling element 311a attached to middle auger or middle auger portion 350b and on at least a second portion 310b (e.g., a bottom portion) of sidewall 370 via coupling element 311b attached to the lower auger or auger portion 350c. Additionally, the one or more auger portions 350a, 350b, 350c may be coupled to the bin 100 at least a first portion 312 of the ceiling 371 of the bin 100 by coupling element 311c attached to the upper auger or auger portion 350a. Attachment points may be at any portion of the sidewall 370 or the ceiling 371. Although three attachment points to sidewall portions 310a, 310b and ceiling portion 312 are shown, one of skill in the art will appreciate that any number of attachment points may be used, for example one, more than one, one or more, a plurality of attachment points. Further for example, one to two, one to three, one to five, five to ten, etc. attachment points may be used with respective coupling elements. Exemplary, non-limiting coupling elements 313 include cables, mounting brackets, metal straps, bolts, supports, and the like.

Figure 7:
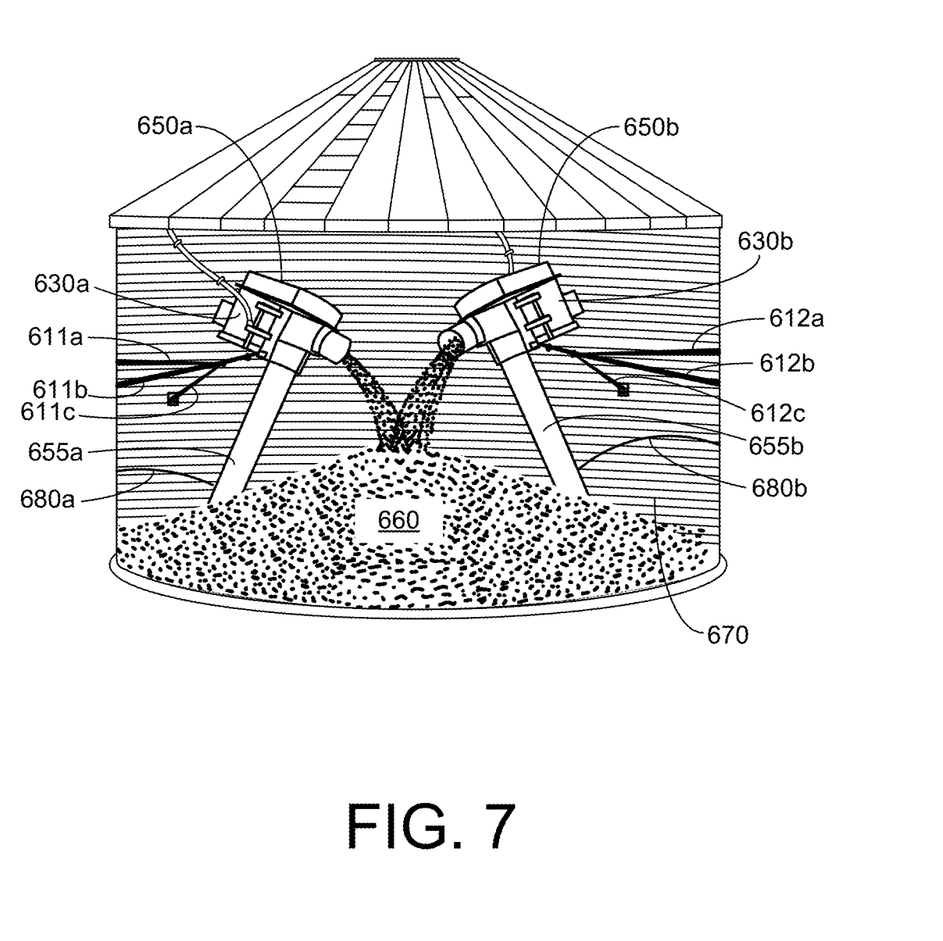
FIG. 7 illustrates an embodiment of a bin including an embodiment of a device for reducing entrapment installed therein including two auger assemblies.

FIG. 7 illustrates a grain bin 100 including a first auger assembly 650a and a second auger assembly 650b. Both auger assemblies 650a, 650b are attached to the inner sidewall 670 of the grain bin 100 by a lower coupling element (not shown) and an upper coupling element. The upper coupling element of the first auger assembly 650a includes a first cable 611a, a second cable 611b, and a third cable 611c, with each cable attached to a respective portion of an upper portion of the sidewall 670. The cables 611a, 611b, 611c are radially separated such that the upper coupling element provides support and stability to the first auger assembly 650a as the first auger assembly 650a is leaned away from the inner sidewall 670 by angle 680a. Angle 680a may be about 10 degrees to about 40 degrees, about 10 degrees to about 30 degrees, about 13 degrees to about 20 degrees, about 15 degrees to about 20 degrees, about 13 degrees to about 18 degrees, and the like. The upper coupling element of the second auger assembly 650b includes a first cable 612a, a second cable 612b, and a third cable 612c, with each cable attached to a respective portion of an upper portion of the sidewall 670. The cables 612a, 612b, 612c are radially separated such that the upper coupling element provides support and stability to the second auger assembly 650b as the second auger assembly 650b is leaned away from the inner sidewall 670 by angle 680b. Angle 680b may be about 10 degrees to about 40 degrees, about 10 degrees to about 30 degrees, about 13 degrees to about 20 degrees, about 15 degrees to about 20 degrees, about 13 degrees to about 18 degrees, and the like. Auger assembly 650a includes a power source 630a, which may be an electric motor coupled to the auger within auger housing 655a by a belt. Auger assembly 650b includes a power source 630b, which may be an electric motor coupled to the auger within auger housing 655b by a belt. With the auger assemblies 650a, 650b angled toward the center of the bin 100, when powered by respective power sources 630a, 630b, the respective augers of auger assemblies 650a, 650b convey grain 660 from the bottom portion of the bin 100 near the bottom portion of the sidewall 670 (e.g., area 104 shown FIG. 6) toward the center of the grain bin 100 (e.g., into the cone area 106 shown in FIG. 6). As such, the grain 660 volume is circulated and conveyed to an advantageous position (e.g., cone area 106 shown in FIG. 6) for unloading.

In some aspects, the one or more augers or auger portions 350a. 350b, 350c may be offset 330 from a floor 360 of bin 100. For example, the offset 330 may be about 6 inches (0.1524 m) to about 10 feet (3.048 m), about 1 foot (0.308 m) to about 3 feet (0.9144 m), about 1 foot (0.308 m) to about 2 feet (0.6096 m), about 1 foot (0.308 m) to about 5 feet (1.524 m), about 5 feet (1.524 m) to about 10 feet (3.048 m), etc. The offset 330 may, for example, prevent the augers or auger portions 350a, 350b, 350c from interfering with other equipment installed in the bin 100, for example sweep augers.

In some aspects, one or more of the augers or auger portions are at least partially encased in or surrounded by a housing or a casing. Augers encased in or surrounded by a housing or casing can convey matter within the housing or casing from a first area to a second area. For example, matter enters the input of the auger housing at a first area (e.g., bottom portion of the bin), is conveyed through the housing of the auger, and exits the auger housing in a second area (e.g., top portion of the bin). The housing may be coupled to a sidewall 370 of the bin 100 by, for example, a cable. The housing or casing (or the augers or auger portions) may be at least partially vibrated by the power source, powering the auger(s) to help break grain crust and also be able to adjust angle 320. In some aspects, one or more augers or auger portions 350a, 350b, 350c may be angled, shown by angle 320, relative to a sidewall 370 of the bin 100. For example, the angle may be about 10 degrees to about 40 degrees, about 10 degrees to about 30 degrees, about 13 degrees to about 20 degrees, about 15 degrees to about 20 degrees, about 13 degrees to about 18 degrees, and the like. Angling the auger portions 350a, 350b, 350c, relative to a sidewall 370 of the bin 100 may transfer the material gathered from the bottom portion of the bin 100 closer to the center of the bin 100. Transferring material closer to the center of the bin 100 may improve unloading capacity, which typically is performed from the bottom-center of the bin 100, and to further move grain away from a sidewall to aerate the material and reduce molding and sticking.

Figure 4:
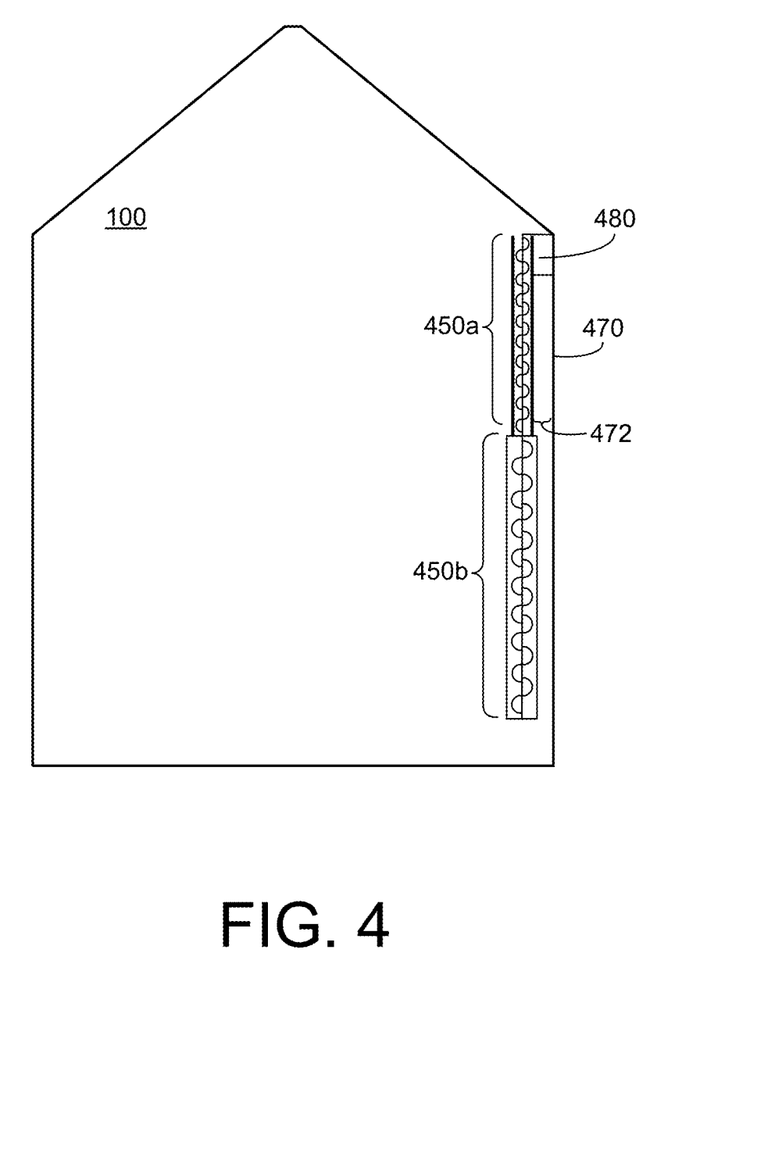
FIG. 4 illustrates an embodiment of a bin including an embodiment of a device for reducing entrapment installed therein.

FIG. 4 shows an embodiment of a device for reducing bin entrapment. As described elsewhere herein, one or more augers or auger portions 450a, 450b are coupled to one or more portions of a sidewall 470 of bin 100. Power source 480 powers the one or more augers or auger portions 450a, 450b. Also as described elsewhere herein, the one or more augers or auger portions may be offset from a floor of bin 100. In one non-limiting example, for a bin having a height of 46 feet (14.0208 m), a bottom portion (e.g., auger 450b) of an auger assembly would be about 25 feet (7.62 m) in height and a top portion (e.g., auger 450a) would be about 21 feet (6.4008 m). Although augers of example lengths are described herein, any number of auger portions of any number of lengths can be used herein to span a vertical height of a bin of interest. Further, in any of the embodiments described herein, augers of any range of diameters may be used, for example 4 inches (10.16 cm) to about 20 inches (50.8 cm), about 4 inches (10.16 cm) to about 10 inches (25.4 cm), about 4 inches (10.16 cm) to about 8 inches (20.32 cm), etc. In embodiments having two or more augers, the augers may or may not be the same or substantially the same length and/or may or may not be the same or substantially the same diameter.

In some implementations, the one or more augers, auger portions, or auger assembly is offset 472 from a vertical inner sidewall 470 of the bin. For example, the offset may be about 3 inches (7.62 cm) to about 3 feet (0.9144 m); about 3 inches (7.62 cm) to about 1 foot (0.3048 m); about 6 inches (15.24 cm) to about 1 foot (0.3048 m); etc.

Figure 5:
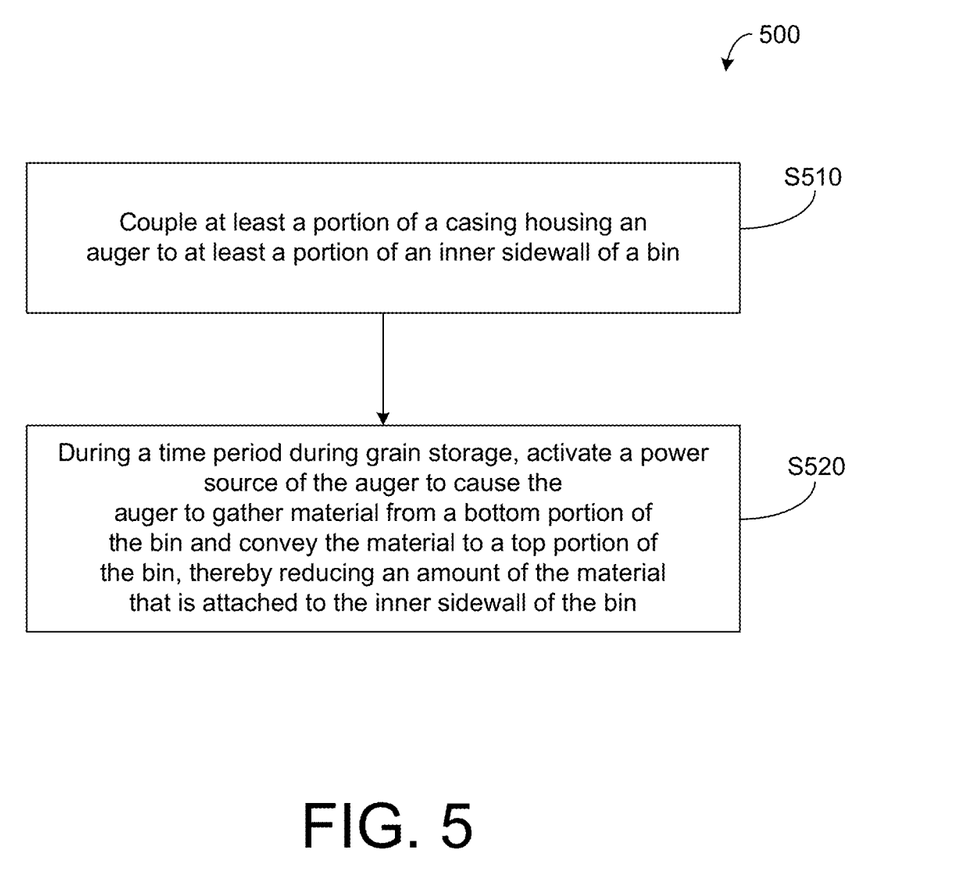
FIG. 5 illustrates an embodiment of a method for reducing bin entrapment.

FIG. 5 shows a method 500 of reducing grain bin entrapment. The method 500 can include coupling at least a portion of a casing housing an auger to at least a portion of an inner sidewall of a bin at block S510; and during a time period during grain storage, activating a power source of the auger to cause the auger to gather material from a bottom portion of the bin and convey the material to a top portion of the bin, thereby reducing an amount of the material that is attached to the inner sidewall of the bin at block S520. The method 500 functions to one or more of: circulate material in the bin, increase drying of material in the bin, reduce sticking or attachment of the material to an inner sidewall of the bin, improve loading of material into the bin, improve unloading of material from the bin, and the like.

In some embodiments, the method 500 at step S510 includes coupling the casing to at least the portion of the inner sidewall of the bin via a coupling element. The coupling element may include is one or more bolts, one or more straps, adhesives, welding, one or more rivets, one or more metal clips, and the like.

In some embodiments, the method 500 at step S520 includes, during a time period during grain storage, activating a power source of the auger to cause the auger to gather material from a bottom portion of the bin and convey the material to a top portion of the bin, thereby reducing an amount of the material that is attached to the inner sidewall of the bin. In some embodiments, activating the power source includes activating the power source while the grain is being loaded into the grain bin. Activating the power source, ultimately activating the auger, may allow for increased distribution of incoming contents. In some embodiments, activating includes activating the power source while the grain is being unloaded from the grain bin. In some embodiments, activating includes activating the power source intermittently (e.g., every other day, once a week, once a month, biweekly, etc.).

In some embodiments, the method 500 further includes determining a volume of the bin or a number of bushels the bin can store; and coupling one or more additional casings housing one or more additional augers to another portion of the inner sidewall of the grain in.

In some embodiments, the method 500 further includes automatically deactivating the power source of the auger.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor in or proximate to the bin and/or on the computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

EXAMPLES

Example 1. A method for reducing grain attachment to an interior wall of a storage container, comprising: fixedly attaching a plurality of portions of a casing housing of an auger to a plurality of sidewall portions of a vertical inner sidewall of a grain bin having a flat bottom; and auger is fully encased in the housing; activating a power source of the auger to cause the auger to gather grain from a bottom portion of the grain bin and convey the grain to a top portion of the grain bin, thereby rotating a volume of the grain bin, thereby rotating the grain that is attached to the inner sidewall of the grain bin, and wherein the auger is activated during a time period during grain storage.

Example 2. The method of any one of the preceding examples, but particularly Example 1, further comprising determining a number of bushels that can be stored in the grain bin; and coupling one or more additional casings housing one or more additional augers to another portion of the vertical inner sidewall of the grain bin based on the determined number.

Example 3. The method of any one of the preceding examples, but particularly Example 1, further comprising deactivating the power source of the auger.

Example 4. The method of any one of the preceding examples, but particularly Example 1, wherein the activating comprises activating the power source intermittently on a time basis while the grain is stored in the grain bin.

Example 5. The method of any one of the preceding examples, but particularly Example 1, wherein the activating comprises activating the power source while the grain is being loaded into the grain bin.

Example 6. The method of any one of the preceding examples, but particularly Example 1, wherein the activating comprises activating the power source while the grain is being unloaded from the grain bin.

Example 7. The method of any one of the preceding examples, but particularly Example 1, wherein coupling is via a coupling element.

Example 8. The method of any one of the preceding examples, but particularly Example 7, wherein the coupling element is one or more bolts.

Example 9. The method of any one of the preceding examples, but particularly Example 1, wherein coupling further comprises offsetting the at least the portion of the casing housing the auger from a floor of the bin.

Example 10. The method of any one of the preceding examples, but particularly Example 9, wherein the offset is about 1 foot (0.308 m) to about 3 feet (0.9144 m).

Example 11. The method of any one of the preceding examples, but particularly Example 1, wherein coupling further comprises offsetting the at least the portion of the casing housing the auger from the vertical inner sidewall.

Example 12. The method of any one of the preceding examples, but particularly Example 11, wherein the offset is about 3 inches (7.62 cm) to about 1 foot (0.3048 m).

Example 13. A system for reducing grain attachment to an interior wall of a storage container, comprising: one or more casings each housing an auger; one or more coupling elements configured to couple the one or more casings to at least a portion of a vertical inner sidewall of a grain bin; a power source configured to activate the auger; and control circuitry.

Example 14. The system of any one of the preceding examples, but particularly Example 13, wherein the control circuitry comprises a timing circuit to intermittently activate the power source to activate, respectively, the auger.

Example 15. The system of any one of the preceding examples, but particularly Example 14, further comprising an antenna configured to receive a remote signal to activate the power source to activate, respectively, the auger.

Example 16. The system of any one of the preceding examples, but particularly Example 13, wherein the control circuitry comprises a processor electrically coupled to memory, and the power source, wherein the processor is configured to execute instructions stored in the memory, the instructions comprising: based on at least on of: an input, one or more sensor measurements, or a predetermined time delay, automatically activating or deactivating the power source to active or deactivate, respectively, the auger.

Example 17. The system of any one of the preceding examples, but particularly Example 16, further comprising an antenna electrically coupled to the processor, wherein the processor further comprises receiving, via the antenna, an input.

Example 18. The system of any one of the preceding examples, but particularly Example 17, further comprising a computing device, wherein the input received by the processor is from the computing device.

Example 19. The system of any one of the preceding examples, but particularly Example 13, wherein the coupling element comprises one or more bolts.

Example 20. The system of any one of the preceding examples, but particularly Example 13, wherein the coupling element comprises one or more metal straps.

Example 21. The system of any one of the preceding examples, but particularly Example 13, wherein the coupling element comprises one or more cables.

Example 22. The system of any one of the preceding examples, but particularly Example 13, wherein the coupling element comprises one or more brackets.

Example 23. The system of any one of the preceding examples, but particularly Example 13, further comprising an electrical box electrically coupled to the power source, the processor, and the antenna.

Example 24. The system of any one of the preceding examples, but particularly Example 13, wherein the one or more casings comprise a first casing housing a first auger and a second casing housing a second auger.

Example 25. The system of any one of the preceding examples, but particularly Example 24, wherein the first auger has a first diameter, and the second auger has a second diameter.

Example 26. The system of any one of the preceding examples, but particularly Example 25, wherein the first diameter is different than the second diameter.

Example 27. The system of any one of the preceding examples, but particularly Example 13, wherein the power source comprises a variable speed engine.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in the description and claims, the singular form "a", "an" and "the" include both singular and plural references unless the context clearly dictates otherwise. For example, the term "auger" may include, and is contemplated to include, a plurality of augers. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for reducing grain attachment to an inner sidewall of a grain bin, comprising:
    fixedly attaching a plurality of portions of a casing, housing an auger, to at least one of: one or more of sidewall portions of a vertical inner sidewall of a grain bin, or one or more of ceiling portions of the grain bin, wherein the auger is fully encased in the housing, wherein fixedly attaching further comprises angling the casing, housing the auger, with respect to the vertical inner sidewall, such that a top portion of the casing is further from the vertical inner sidewall than a bottom portion of the casing is from the vertical inner sidewall; and
    activating a power source of the auger to cause the auger to gather grain from a bottom portion of the grain bin and convey the grain to a top portion of the grain bin, thereby circulating a volume of the grain bin, thereby circulating the grain that is attached to the inner sidewall of the grain bin,
    wherein the auger is activated during a time period during grain storage.

2. The method of claim 1, further comprising determining a number of bushels that can be stored in the grain bin; and fixedly attaching one or more additional casings, housing one or more additional augers, to at least one of: another one or more of sidewall portions of the vertical inner sidewall of a grain bin or another one or more of ceiling portions of a grain bin based on the determined number of bushels.

3. The method of claim 1, wherein the activating the power source of the auger comprises activating the power source intermittently on a time basis while the grain is stored in the grain bin.

4. The method of claim 1, wherein the activating the power source of the auger comprises activating the power source while the grain is being loaded into the grain bin.

5. The method of claim 1, wherein fixedly attaching is via a plurality of coupling elements, including a first coupling element fixedly attaching a bottom portion of the casing to one or more sidewall portions of the grain bin, and a second coupling element fixedly attaching a top portion of the casing to at least one of: one or more of sidewall portions of the vertical inner sidewall of a grain bin or one or more of ceiling portions of the grain bin.

6. The method of claim 5, wherein the plurality of coupling elements comprises at least one of: one or more bolts, one or more metal straps, one or more cables, or one or more brackets.

7. The method of claim 1, wherein fixedly attaching further comprises offsetting the auger, from a floor of the bin.

8. The method of claim 7, wherein the offset is about 1 foot (0.308 m) to about 3 feet (0.9144 m).

9. The method of claim 1, wherein the angle of the casing with respect to the vertical inner sidewall is about 10 degrees to about 40 degrees.

10. A system for reducing grain attachment to an inner sidewall of a grain bin, comprising:
    one or more casings each housing an auger;
    one or more coupling elements configured to couple the one or more casings to at least a portion of a vertical inner sidewall of a grain bin, wherein the one or more casings are coupled to the vertical inner sidewall such that the one or more casings are angled, with respect to the inner sidewall, such that a top portion of each casing is further from the vertical inner sidewall than a bottom portion of each casing is from the vertical inner sidewall;
    a power source configured to activate the one or more augers, respective to the one or more casings; and
    control circuitry configured to control the power source, wherein the one or more casings are configured to gather grain from a bottom portion of the grain bin and convey the grain to a top portion of the grain bin, thereby circulating a volume of the grain bin, thereby circulating the grain that is attached to the inner sidewall of the grain bin.

11. The system of claim 10, wherein the control circuitry comprises a timing circuit to intermittently activate the power source to activate each auger.

12. The system of claim 11, further comprising an antenna configured to receive a remote signal to activate the power source to activate each auger.

13. The system of claim 10, wherein the control circuitry comprises a processor electrically coupled to memory, and the power source, wherein the processor is configured to execute instructions stored in the memory, the instructions comprising:
    based on at least one of: an input, or a predetermined time delay, automatically activating or deactivating the power source to activate or deactivate, respectively, the auger.

14. The system of claim 13, further comprising an antenna electrically coupled to the processor, wherein the processor further comprises receiving, via the antenna, the input.

15. The system of claim 14, further comprising a computing device, wherein the input received by the processor is from the computing device.

16. The system of claim 10, wherein the one or more coupling elements each comprise at least one of: one or more bolts, one or more metal straps, one or more cables, or one or more brackets.

17. The system of claim 10, wherein the one or more casings comprise a first casing housing a first auger and a second casing housing a second auger.

18. The system of claim 17, wherein the first auger has a first diameter, and the second auger has a second diameter, different than the first diameter.

19. The system of claim 13, further comprising one or more sensors, wherein the instructions further comprise automatically activating or deactivating the power source to activate or deactivate, respectively, the auger based on the one or more sensor measurements.

* * * * *